US011906476B2

(12) United States Patent
Terasaki et al.

(10) Patent No.: US 11,906,476 B2
(45) Date of Patent: Feb. 20, 2024

(54) JOINING STATE DETECTION FILM, JOINING STATE DETECTION DEVICE, AND JOINING STATE DETECTION METHOD

(71) Applicant: NATIONAL INSTITUTE OF ADVANCED INDUSTRIAL SCIENCE AND TECHNOLOGY, Tokyo (JP)

(72) Inventors: Nao Terasaki, Tosu (JP); Yuki Fujio, Tosu (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 232 days.

(21) Appl. No.: 17/258,424

(22) PCT Filed: Jun. 13, 2019

(86) PCT No.: PCT/JP2019/023474
§ 371 (c)(1),
(2) Date: Jan. 6, 2021

(87) PCT Pub. No.: WO2020/017199
PCT Pub. Date: Jan. 23, 2020

(65) Prior Publication Data
US 2021/0285856 A1  Sep. 16, 2021

(30) Foreign Application Priority Data
Jul. 19, 2018 (JP) .................................. 2018-135871

(51) Int. Cl.
*G01N 3/06* (2006.01)
*G01N 3/40* (2006.01)
(Continued)

(52) U.S. Cl.
CPC ............... *G01N 3/068* (2013.01); *G01N 3/40* (2013.01); *B29C 65/022* (2013.01); *B29C 65/48* (2013.01); *B29C 65/561* (2013.01); *B29C 65/60* (2013.01)

(58) Field of Classification Search
CPC ....................................................... G01N 3/068
(Continued)

(56) References Cited

U.S. PATENT DOCUMENTS

2018/0113035 A1*  4/2018  Kim ...................... G02F 1/0072

FOREIGN PATENT DOCUMENTS

JP   2006038586 A   2/2006
JP   2009092644 A   4/2009
(Continued)

OTHER PUBLICATIONS

Murofushi et al. Translation of JP 2016151544. Published Aug. 2016. Accessed/translated Sep. 2022. (Year: 2016).*
(Continued)

*Primary Examiner* — Walter L Lindsay, Jr.
*Assistant Examiner* — Philip T Fadul
(74) *Attorney, Agent, or Firm* — McCoy Russell LLP

(57) ABSTRACT

An object is to provide a joining state detection film, a joining state detection device, and a joining state detection method, capable of detecting a joining state of a joining portion of two members from the outside. [Solution]A film containing a mechanoluminescent substance is formed on a surface, on a side opposite to a joining surface, of at least one member of two members that are joined at joining parts each having the joining surface, and physical stimulation is applied thereto.

6 Claims, 11 Drawing Sheets

(51) Int. Cl.
  *B29C 65/02* (2006.01)
  *B29C 65/48* (2006.01)
  *B29C 65/56* (2006.01)
  *B29C 65/60* (2006.01)

(58) Field of Classification Search
  USPC .......................................................... 73/800
  See application file for complete search history.

(56) References Cited

FOREIGN PATENT DOCUMENTS

| | | | | |
|---|---|---|---|---|
| JP | 2012198164 A | 10/2012 | | |
| JP | 2017128180 A | 8/2017 | | |
| WO | WO-2014086574 A1 * | 6/2014 | ......... | G01N 21/6456 |

OTHER PUBLICATIONS

Xu et al. Translation of JP 2006038586. Published Feb. 2006. Accessed/translated Sep. 2022. (Year: 2006).*

Luger et al. Translation of WO-2014086574-A1. Published Jun. 2014. Accessed Apr. 2023. (Year: 2014).*

Li, C. et al., "Real-time Monitoring of Dynamic Stress Concentration by Mechanoluminescent Sensing Film," Applied Mechanics and Materials, vol. 13-14, Jul. 11, 2008, 5 pages.

Terasaki, N. et al., "Mechanolumiescence assisted double cantilever beam (DCB) test for evaluation of fracture toughness at adhesive phase and laye," Proceedings of the 65th JSAP Spring Meeting, Mar. 17, 2018, WAEDA University, Nishiwaseda Campus, 3 pages. (Submitted with English Abstract).

ISA Japan Patent Office, International Search Report Issued in Application No. PCT/JP2019/023474, dated Aug. 27, 2019, WIPO, 4 pages.

* cited by examiner

JOINING STATE DETECTION FILM, JOINING STATE DETECTION DEVICE, AND JOINING STATE DETECTION METHOD

CROSS REFERENCE TO RELATED APPLICATIONS

The present application is a U.S. National Phase of International Application No. PCT/JP2019/023474 entitled "JOINING STATE DETECTION FILM, JOINING STATE DETECTION DEVICE, AND JOINING STATE DETECTION METHOD," and filed on Jun. 13, 2019. International Application No. PCT/JP2019/023474 claims priority to Japanese Patent Application No. 2018-135871 filed on Jul. 19, 2018. The entire contents of each of the above-listed applications are hereby incorporated by reference for all purposes.

TECHNICAL FIELD

The present invention relates to a joining state detection film capable of detecting a joining state of joining parts from the outside, a joining state detection device, and a joining state detection method.

BACKGROUND AND SUMMARY

Recent products are mostly configured so that a plurality of members are joined, regardless of size. Examples of methods for joining members include bonding using an adhesive, joining using a nut and a bolt, or a screw, joining using a rivet, anodic bonding, and welding. The method for joining members is appropriately selected according to the qualities of the members to be joined, use applications, or the like.

For a product in which joining by the joining method is adapted, safety at a joining portion is required. It is necessary that the joining strength at the time of completion of joining and the joining strength after a certain period of time has passed be measured.

In particular, it has been known that the joining strength in joining using an adhesive is decreased because of a joining failure portion, a curing state of the adhesive, deterioration of the adhesive, a surface state of the members to be joined, for example, a dirt of a bonding surface (joining surface), and the like.

As a method for measuring such a joining strength, there has been a method in which the joined members are subjected to a fracture test to measure the maximum strength, or are subjected to a fracture toughness test to measure the fracture toughness value, and the resulting values are adopted as the joining strength.

A device has been proposed in which an ultrasonic wave with which a joining portion has been irradiated is received and analyzed to determine a bonding state (see Patent Literature 1).

In addition, a method has been proposed in which the luminescence of a mechanoluminescent substance when an external force is applied to members bonded using an adhesive containing the mechanoluminescent substance is measured to determine the stress distribution in an adhesive layer (see Patent Literature 2).

CITATION LIST

Patent Literature

[Patent Literature 1] Japanese Patent Application Laid-Open No. 2017-138180
[Patent Literature 1] Japanese Patent Application Laid-Open No. 2006-38586

Technical Problem

However, in the methods for a fracture test and a fracture toughness test, the joined members are required to be ruptured. Therefore, there is a problem in which these methods cannot be applied to an actual structure. This also means that there arises a problem in which an influence (deterioration over time) of secular change on a joining state of the same members (structure) cannot be detected.

The method using an ultrasonic wave disclosed in Patent Literature 1 can determine that bonded members are not properly bonded, or that a space (void) is present between the bonded members and an adhesive. However, the method has a problem in which a decrease in a bonding force due to some reasons (weak bond, kissing bond, etc.) cannot be detected.

In the aforementioned method for measuring the stress distribution in the adhesive layer using the mechanoluminescent substance, it is required to mix a mechanoluminescent material in the adhesive, and measure the luminescence of the mechanoluminescent substance during application of an external force. Therefore, this method has a problem in which the joined members need to be transparent, and a problem in which the joining state of the joining portion cannot be detected from the outside.

Solution to Problem

The present inventor has intensively studied about the aforementioned problems, and as a result, found that when a joining state detection film as described below is formed on a surface of joined members on a side opposite to a joining surface thereof, and physical stimulation is applied to a joining part including the joining surface, the joining state of the joined members can be detected from a luminescent state of the joining state detection film.

Specifically, when physical stimulation is applied to the joining part in which the members are joined with uniform strength, the joining state detection film emits light having uniform intensity. However, when physical stimulation is applied to a joining part in which the members are partially not joined, light is emitted at a portion where the members are joined, but light is not emitted at a portion where the members are not joined. Therefore, by detecting the luminescence of the joining part, the joining state can be detected from the outside.

From these findings, the present inventor has found the following epochal joining state detection film, joining state detection device, and joining state detection method.

A first aspect of the present invention to solve the aforementioned problems is a joining state detection film that detects a joining state of two members that are joined at joining parts each having a joining surface. The joining state detection film is formed on a surface of at least one of the members on a side opposite to the joining surface thereof and includes a mechanoluminescent substance.

Herein, the "joining state" means a state in which members are connected by some methods such as adhesion, fixing, and fusing.

The "mechanoluminescent substance" means a substance that emits light (including visible light, ultraviolet light, and near-infrared light) under deformation caused by a mechanical external force. Examples of the mechanoluminescent substance may include a substance including as a main component an oxide, a sulfide, a selenide, or a telluride that has a spinel structure, a corundum structure, a β-alumina structure, a silicate, a defect-controlled aluminate, or a structure including a mixture of a wurtzite structure and a zincblende structure, and a substance in which at least a portion of alkali metal ions and alkaline earth metal ions that constitute the structures is replaced by at least one metal ion of rare earth metal ions and transition metal metals. The joining state detection film of the present invention and a joining state visualization film described below may contain two or more mechanoluminescent substances.

Examples of the mechanoluminescent substance may include those classified into an alumina-based substance, a silica-based substance, a phosphoric acid-based substance, a titanium oxide-based substance, a zinc sulfide-based substance, and other substances.

Specific examples of the alumina-based substances may include $xSrO \cdot yAl_2O_3 \cdot zMO$ (M is a divalent metal, Mg, Ca, or Ba, and x, y, and z are each an integer. Although M is not limited to particular one as long as it is a divalent metal, it is preferably Mg, Ca, or Ba. x, y, and z each represent an integer of 1 or more), $Al_2O_3:Tb^{3+}$, $SrAl_2O_4:M$ (a substance doped with at least one of $M=Eu^{2+}$, $Dy^{3+}$, $Ce^{3+}$, and $Ho^{3+}$), $ZnAl_2O_4:M$ (doped with at least one of $M=Eu^{2+}$, $Mn^{2+}$, $Dy^{3+}$, $Ce^{3+}$, and $Ho^{3+}$), $SrAl_2O_4:Eu^{2+}$, $SrAl_2O_4:Ce^{3+}$, $SrAl_2O_4:Eu^{2+}$, $Dy^{3+}$, $SrAl_2O_4:Eu^{2+}$, $Ho^{3+}$, $SrAl_2O_4:Ho^{3+}$, $Ce^{3+}$, $XAl_2O_4:M$ (doped with one or two of X=Sr, Ba, Mg, Ca, and Zn, and doped with at least one of $M=Eu^{2+}$, $Dy^{3+}$, $Tb^{3+}$, and $Ho^{3+}$), and $SrAl_2O_4:Eu^{2+}$, $Cr^{3+}$, $Nd^{3+}$.

Herein, "doped" is a concept also including "co-doping" in which two or more substances are doped at the same time and "activation".

Further specific examples of other alumina-based substances may include substances represented by a general formula of $Sr\{1-(2x+3y+3z)/2\}Al_2O_4:xEu^{2+}, yCr^{3+}, zNd^{3+}$ (provided that x, y, and z each represent 0.25 to 10 mol %, preferably 0.5 to 2 mol %), $Sr_3Al_2O_6:Eu^{2+}$, $CaYAl_3O_7:Eu^{2+}$, $CaYAl_3O_7:M$ (doped with at least one of $M=Eu^{2+}$, $Ce^{3+}$, $Dy^{3+}$, $Ce^{3+}$, and $Ho^{3+}$), and $SrMgAl_{10}O_{17}:Ce^{3+}$.

Specific examples of the silica-based substances may include $xSrO \cdot yAl_2O_3 \cdot zSiO_2$ (x, y, and z each represent an integer), $Ca_2Al_2Si_2O_7:Ce^{3+}$, $X_2Al_2SiO_7:M$ (doped with at least one of X=Ca and Sr, and doped with any one of $M=Eu^{2+}$, $Eu^{3+}$, $Ce^{3+}$, and $Dy^{3+}$), $Ca_2MgSi_2O_7:Ce^{3+}$, $X_2MgSi_2O_7:M$ (doped with any one of X=Ba, Ca, and Sr, or doped with any one of $X_2=SrCa$ and SrBa and at least one of $M=Eu^{2+}$, $Dy^{3+}$, and $Ce^{3+}$), $CaAl_2Si_2O_8:Eu^{2+}$, $SrCaAl_2Si_2O_8:Eu^{2+}$, $Ca_3Y_2Si_3O_{12}:RE^{3+}$ (doped with at least one of $RE^{3+}=Dy^{3+}$ and $Eu^{2+}$), and $BaSi_2O_2N_2:Eu^{2+}$.

Specific examples of the phosphoric acid-based substances may include $Li_3PO_4:RE$ (RE=$Dy^{3+}$, $Tb^{3+}$, $Ce^{3+}$, or $Eu^{2+}$), $LiXPO_4:Eu^{2+}$ (X=any one of Sr and Br), $Li_2BaP_2O_7:Eu^{2+}$, and $CaZr(PO_4)_2:Eu^{2+}$.

Specific examples of the titanium oxide-based substances may include $CaTiO_3:Pr^{3+}$, $BaCaTiO_3:Pr^{3+}$, and $BaTiO_3$—$CaTiO_3:Pr^{3+}$.

Specific examples of the zinc sulfide-based substance may include ZnS:M (Although M is not limited to particular one as long as it is a divalent metal, it is preferably Mn, Ga, or Cu. Doped with at least one of $M=Mn^{2+}$, $Ga^{2+}$, $Te^{2+}$, $Cu^{2+}$, CuCl, and Al), XZnOS:M (doped with any one of X=Ca and Ba, and any one of $M=Mn^{2+}$ and $Cu^{2+}$), and ZnMnTe.

Specific examples of the other substances may include $CaZrO_3:Eu^{3+}$, $CaNb_2O_n:Pr^{3+}$ (n=6 or 7), $(Sr,Ca,Ba)(2)SnO_4:Sm3+$, $La^{3+}$, $Sr_{n+1}Sn_nO_{3n+1}:Sm^{3+}$ (n=1, 2, or more), $Y_2O_3:Eu^{2+}$, $ZrO_2:Ti$, and $XGa_2O_4:Mn^{2+}$ (X=any one of Zr and Mg).

In such a first aspect, when physical stimulation is directly or indirectly applied to the joining state detection film, the joining state detection film emits light. Analysis of this luminescent state can thus detect the joining state of the two members from the outside. In addition, when the joining state is detected after a predetermined period of time, an influence (deterioration over time) of secular change on the joining state of the same members (structure) can be detected.

A second aspect of the present invention is the joining state detection film according to the first aspect, wherein the total weight proportion of the mechanoluminescent substance is 20 wt % to 80 wt %.

In the second aspect, the luminescent intensity of the joining state detection film is high, and therefore the joining state of the two members can be detected more easily and accurately.

A third aspect of the present invention is the joining state detection film according to the first or second aspect, wherein the mechanoluminescent substance is a substance represented by $SrAl_2O_4$ that is doped with $Eu^{2+}$, a substance represented by $SrAl_2O_4$ that is doped with at least one of $Eu^{2+}$, $Ho^{3+}$, $Dy^{2+}$, $M_1$, $M_2$, and $M_3$ ($M_1$, $M_2$, and $M_3$=different monovalent to trivalent metal ions), or a substance represented by $CaYAl_3O_7$ that is doped with $Eu^{2+}$.

In the third aspect, the luminescent intensity of the joining state detection film is higher, and therefore the joining state of the two members can be detected much more easily and accurately.

A fourth aspect of the present invention is the joining state detection film according to any one of the first to third aspects, wherein the two members are joined using at least any one of an adhesive, a rivet, a bolt and a nut, a screw, a clinching fastener, and swaging.

Herein, the adhesive includes the adhesive in a state before solidification and the adhesive in a state after solidification.

In the fourth aspect, the joining state of the two members can be detected even when in the joining, an adhesive, a rivet, a bolt and a nut, a screw, a clinching fastener, or swaging is used.

A fifth aspect of the present invention is the joining state detection film according to any one of the first to third aspects, wherein the two members are joined by static electricity, anodic bonding, or welding.

In the fifth aspect, the joining state of the two members can be detected even when the joining is joining by static electricity, anodic bonding, or welding (arc welding, gas welding, thermit welding, electron beam welding, laser welding, flash butt welding, resistance welding (spot welding, projection welding, seam welding), solid phase joining (ultrasonic wave joining, friction welding, friction (stir) joining, explosion joining, electromagnetic pulse joining, friction stir spot joining), forge welding, explosive welding, soldering, or the like).

A sixth aspect of the present invention is a joining state detection device configured to detect a joining state of two members including the joining state detection film according to any one of the first to fifth aspects, and a stimulation unit configured to physically stimulate the joining part.

In the sixth aspect, when physical stimulation is directly or indirectly applied to the joining state detection film by the stimulation unit, the joining state detection film emits light. Analysis of this luminescent state can thus detect the joining state of the two members from the outside. In addition, when the joining state is detected after a predetermined period of time, an influence (deterioration over time) of secular change on the joining state of the same members (structure) can be detected.

A seventh aspect of the present invention is the joining state detection device according to the sixth aspect, further including a joining state visualization film containing a mechanoluminescent substance on at least one of a side surface and an end surface of the joining part.

In the seventh aspect, a state of strain of an adhesive or each member, easiness of movement (bending, rotation, vibration, or the like), or the like, can be visualized.

An eighth aspect of the present invention is a joining state detection method including the steps of forming a joining state detection film containing a mechanoluminescent substance on a surface, on a side opposite to a joining surface, of at least one of two members that are joined at joining parts each having the joining surface, and physically stimulating the joining part.

In the eighth aspect, when physical stimulation is directly or indirectly applied to the joining state detection film, the joining state detection film emits light. Therefore, analysis of this luminescent state can detect the joining state of the two members from the outside.

A ninth aspect of the present invention is the joining state detection method according to the eighth aspect, wherein the total weight proportion of the mechanoluminescent substance in the joining state detection film is 20 wt % to 80 wt %.

In the ninth aspect, the luminescent intensity of the joining state detection film is high, and therefore the joining state of the two members can be detected more easily and accurately.

A tenth aspect of the present invention is the joining state detection method according to the eighth or ninth aspect, wherein the mechanoluminescent substance contained in the joining state detection film is a substance represented by $SrAl_2O_4$ that is doped with $Eu^{2+}$, a substance represented by $SrAl_2O_4$ that is doped with at least one of $Eu^{2+}$, $Ho^{3+}$, $Dy^{2+}$, $M_1$, $M_2$, and $M_3$ ($M_1$, $M_2$, and $M_3$ are different monovalent to trivalent metal ions), or a substance represented by $CaYAl_3O_7$ that is doped with $Eu^{2+}$.

In the tenth aspect, the luminescent intensity of the joining state detection film is higher, and therefore the joining state of the two members can be detected much more easily and accurately.

An eleventh aspect of the present invention is the joining state detection method according to any one of the eighth to tenth aspects, wherein the two members are joined using an adhesive, a rivet, a bolt and a nut, a screw, a clinching fastener, or swaging.

In the eleventh aspect, the joining state of the two members can be detected even when the two members are joined using an adhesive, a rivet, a bolt and a nut, a screw, a clinching fastener, or swaging.

A twelfth aspect of the present invention is the joining state detection method according to any one of the eighth to tenth aspects, wherein the two members are joined by static electricity, anodic bonding, or welding.

In the twelfth aspect, the joining state of the two members can be detected even when the two members are joined by static electricity, anodic bonding, or welding.

DETAILED DESCRIPTION

Hereinafter, embodiments of a joining state detection film and a joining state detection method according to the present invention will be described with reference to the accompanying drawings. The present invention is not limited to the following embodiments.

First Embodiment

In this embodiment, a joining state detection device and a joining state detection method that detect a joining state when two members are joined using an adhesive will be described.

Figure 1:
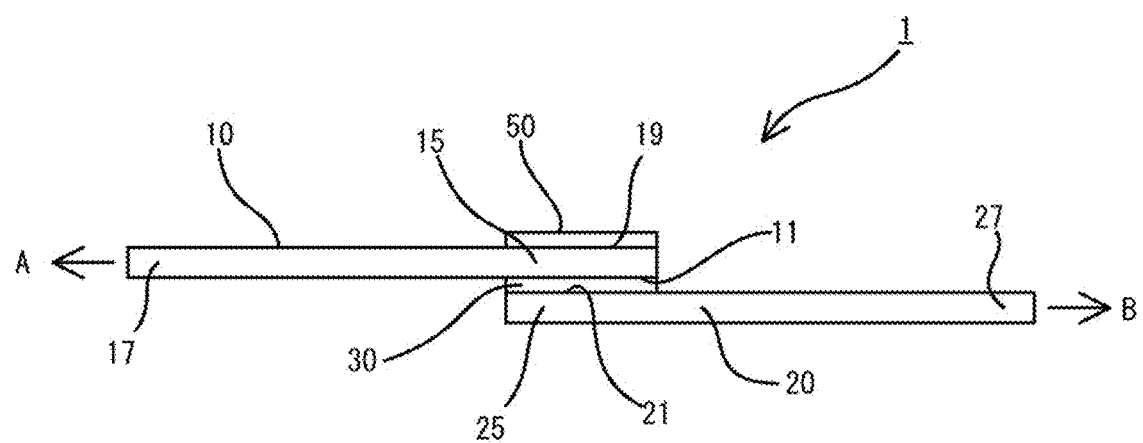
FIG. 1 is a schematic side view of a joining state detection device according to a first embodiment.
Figure 2:
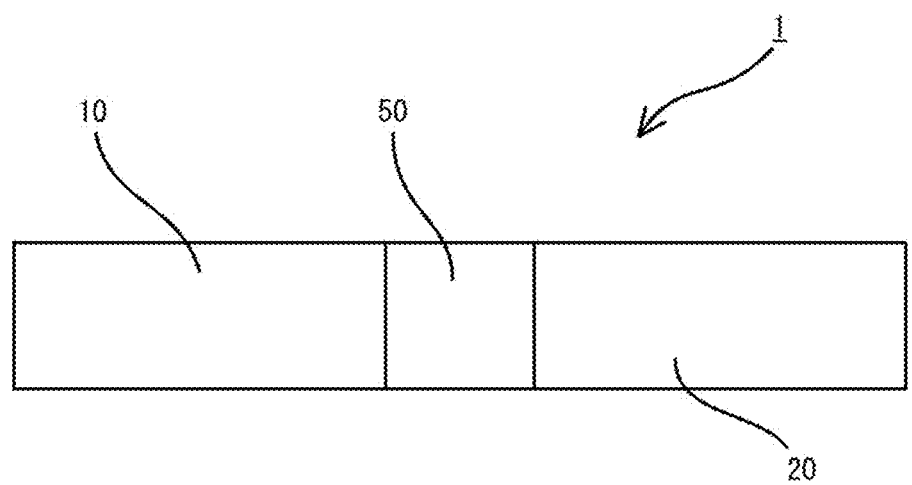
FIG. 2 is a schematic top view of the joining state detection device according to the first embodiment.

FIG. 1 is a schematic side view of a joining state detection device according to the embodiment. FIG. 2 is a schematic top view of the joining state detection device according to this embodiment. As illustrated in these drawings, members 10 and 20 are joined (bonded) at joining surfaces 11 and 21 through an adhesive 30. Herein, the joining surface 11, 21 refers to, of the facing surface of a member 10, 20, a surface of a portion that is in contact with the other member.

On a surface 19, on a side opposite to the joining surface 11, of an end (joining part 15) including the joining surface 11 of the member 10, a joining state detection film 50 is formed. Above the joining state detection film 50, a camera (not shown in the drawings) as a recording unit is disposed. The luminescent state of the joining state detection film 50 can be recorded as described below.

An end 17 of the member 10 on a side opposite to the joining part 15 and an end 27 of the member 20 on a side opposite to a joining part 25 (an end including the joining surface 11 of the member 20) are each connected to a stimulation unit (not shown in the drawings), so that the member 10 can be drawn in an A direction and the member 20 can be drawn in a direction opposite to the A direction (B direction).

Herein, the size, shape, material, and the like of the members 10 and 20 are not particularly limited as long as the members 10 and 20 can be joined (bonded) through the adhesive 30. The size, shape, and material thereof may be different. Examples of the material of the members 10 and 20 may include a metal, a ceramic, a resin, a mineral, a thermoplastic composite material, a thermosetting composite material, and a fiber-reinforced composite material (carbon fiber-reinforced plastic and glass fiber-reinforced plastic).

The adhesive 30 is not particularly limited as long as it is capable of joining the members 10 and 20. Examples of the adhesive 30 may include a synthetic adhesive (an acrylic resin-based adhesive, an acrylic resin anaerobic adhesive, an acrylic resin emulsion adhesive, an acrylic resin-based pressure sensitive tape, an α-olefinic adhesive, a urethane resin-based adhesive (one-part and two-part), a urethane resin emulsion adhesive, an ether-based cellulose, an ethylene-vinyl acetate resin emulsion adhesive, an epoxy resin-based adhesive (one-part and two-part), an epoxy resin emulsion adhesive, a vinyl chloride resin solvent-based adhesive, a chloroprene rubber-based adhesive, a cyanoacrylate-based adhesive, a silicone-based adhesive, an aqueous polymer-isocyanate-based adhesive, a styrene-butadiene rubber solution-based adhesive, a styrene-butadiene rubber-based latex adhesive, a nitrile rubber-based adhesive, a nitrocellulose adhesive, a nitrocellulose adhesive, a reactive hot-melt adhesive, a phenolic resin-based adhesive, a modified silicone-based adhesive, a polyamide resin hot-melt adhesive, a polyurethane resin hot-melt adhesive, a polyolefin resin hot-melt adhesive, a polyvinyl acetate resin solution-based adhesive, a polystyrene resin solvent-based adhesive, a polyvinyl alcohol-based adhesive, a polyvinyl pyrrolidone resin-based adhesive, a polyvinyl butyral resin-based adhesive, a polybenzimidazole adhesive, a polymethacrylate resin solution-based adhesive, a polymethacrylate resin solution-based adhesive, a melamine resin-based adhesive, a urea resin-based adhesive, a resorcinol-based adhesive, an adhesive that controls solid and liquid states by light or heat (including 1,2,3,4,5,6-hexa-O-[11-[4-(4-hexylphenylazo)phenoxy]undecanoyl]-D-mannitol, or a substance including a combination of a sugar alcohol having a branched structure and a plurality of anthracenes to be bonded to each other in response to light)), a natural rubber-based adhesive (an adhesive containing a latex as a main component, etc.), a starch-based adhesive (an adhesive containing a plant-derived starch as a main component, etc.), a casein adhesive an adhesive containing casein as a main component, etc.), a fibrin adhesive (an adhesive using fibrin, etc.), a cement, an asphalt, a solder, a glue, a lacquer, an albumin, and an epoxy adhesive sheet (e.g., AF-163 available from 3M Company).

The joining state detection film 50 is not particularly limited as long as it contains the mechanoluminescent substance. The joining state detection film 50 may be one produced, for example, by uniformly mixing an epoxy resin or a urethane resin, a curing agent for controlling a cross-linking-curing reaction of the resin, a solvent, the aforementioned mechanoluminescent substance, and a dispersant/adjuvant for uniformly dispersing the mechanoluminescent substance, and curing the mixture.

The concentration (weight proportion) of the mechanoluminescent substance in the joining state detection film 50 is not particularly limited. The concentration is preferably within a range of 20 wt % to 80 wt % since light emission can be confirmed by visual check. The concentration is more preferably within a range of 50 wt % to 70 wt % since light emission can be obviously confirmed by visual check.

The thickness of the joining state detection film 50 is not particularly limited. From the viewpoint of luminescent intensity and easiness in handling, the thickness is preferably within a range of 1 m to 1 mm, and more preferably within a range of 10 m to 500 m.

The joining state detection film 50 may be formed directly on a surface of the member 10 (by solution application and curing). The joining state detection film 50 may be formed on the surface of the member by attaching a joining state detection film that has been formed (obtained by mixing the mechanoluminescent substance in a nonwoven fabric) to the surface of the member 10.

The stimulation unit is not particularly limited as long it is capable of drawing the member 10 in the A direction and drawing the member 20 in the B direction. Examples of the stimulation unit may include a drawing device. The recording unit is not particularly limited. A commercially available camera or video camera may be used.

Next, the operation of a joining state detection device 1 according to the embodiment will be described. On the surface 19 of the member 10 on the side opposite to the joining surface 11 thereof, the joining state detection film 50 is formed. Subsequently, the member 10 is drawn in the A direction, and the member 20 is drawn in the B direction by the stimulation unit. The member 10 is thus elongated, and as a result, the joining state detection film 50 is also elongated. As a result, the joining state detection film 50 emits light, and the luminescent state is recorded by a camera.

The joining state detection device 1 is configured as described above. When the joining state detection film 50 is physically stimulated by the stimulation unit, the joining state detection film 50 emits light. Analysis of the luminescent state can detect the joining state of the members 10 and 20.

Example 1

Figure 3A:
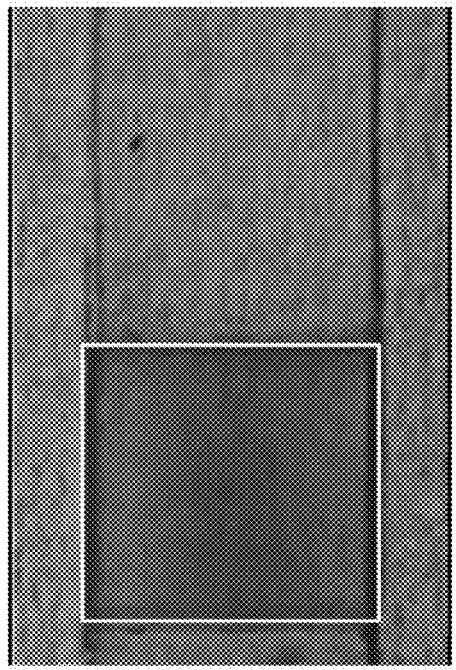
FIG. 3A is a photograph of joining when an adhesive is applied to an entire surface of a joining part in Example 1.

As a member, polycarbonate members of 150 mm×25 mm with a thickness of about 3 mm were used. An adhesive (DENATITE 2204 available from Nagase ChemteX Corporation) was applied to an entire surface of a joining surface, and the members were joined (curing temperature: 100° C.) to produce a joining assembly, as shown in FIG. 3A. Subsequently, $SrAl_2O_4:Eu^{2+}$ that is a mechanoluminescent substance (available from Sakai Chemical Industry Co., Ltd.) was dispersed in a photocurable acrylic resin (available from MICROJET Corporation) to produce a mixed liquid. The mixed liquid was applied to one of the members (including a joining part) and cured to form a joining state detection film with a thickness of about 0.1 mm. A rectangular portion surrounded by a white line is the joining part.

Figure 3B:
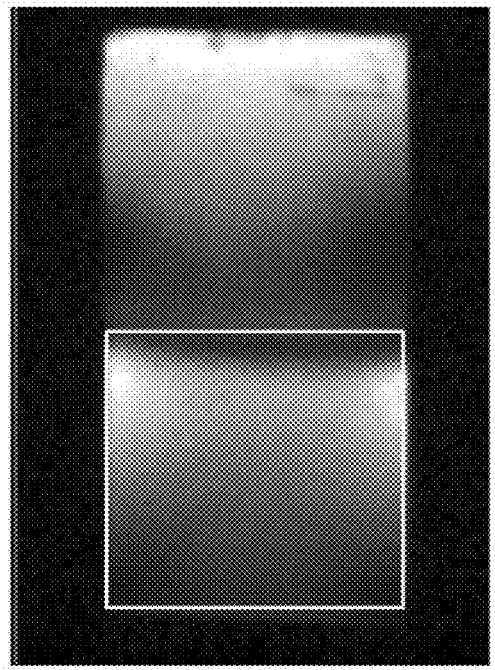
FIG. 3B is a photograph illustrating a luminescent state of a joining state detection film with application of physical stimulation.

The joining assembly thus produced was installed in a drawing device as a stimulation unit. FIG. 3B is a photograph in which the luminescent state of the joining state detection film obtained during drawing at 2,000 N is recorded.

As can be seen from this drawing, it was found that the joining state detection film of a part corresponding to the joining part in which the members were joined using the adhesive emitted light over the substantially entire surface. In this example, the joining state detection film was formed on a surface of the assembly other than the joining part, and therefore, light was emitted at the surface other than the joining part (the same is applied to Examples 2 to 4 described below).

Example 2

Figure 4A:
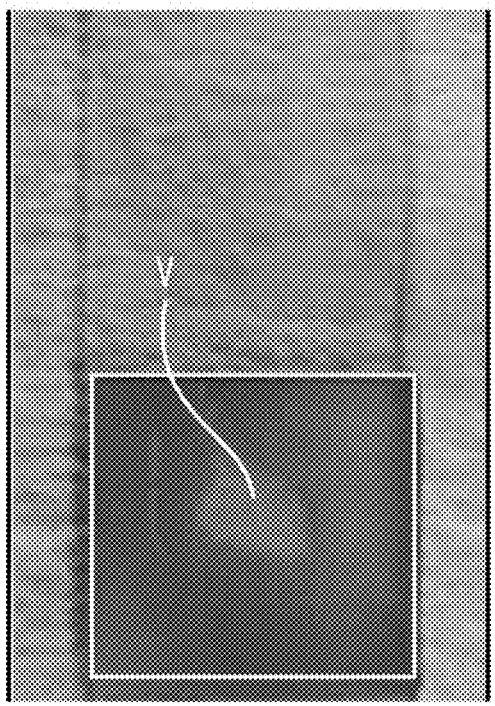
FIG. 4A is a photograph of joining when an adhesive is not applied to a center of a joining part in Example 2.

As illustrated in FIG. 4A, a joining state detection film was formed in the same manner as that in Example 1 except that a portion V where an adhesive was not applied was present at a center of a rectangular joining part surrounded by a white line.

Figure 4B:
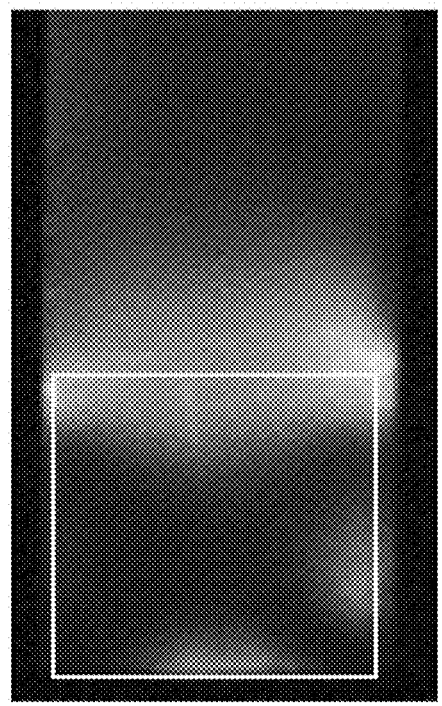
FIG. 4B is a photograph illustrating a luminescent state of a joining state detection film with application of physical stimulation.

FIG. 4B is a photograph in which the luminescent state of the joining state detection film obtained during drawing by a drawing device in the same manner as that in Example 1 is recorded.

As can be seen from this drawing, it was found that light was not emitted at the center of the joining state detection film that corresponded to the joining part, unlike Example 1.

Example 3

Figure 5A:
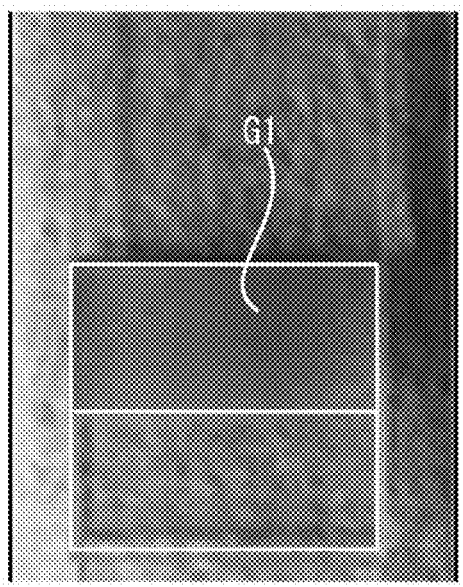
FIG. 5A is a photograph of joining when an adhesive is applied to an upper portion of a joining part in Example 3.

As illustrated in FIG. 5A, a joining state detection film was formed in the same manner as that in Example 1 except that an adhesive was applied to only an upper portion G1 of a joining part and members were joined (the adhesive was not applied at a portion other than G1 of the joining part).

Figure 5B:
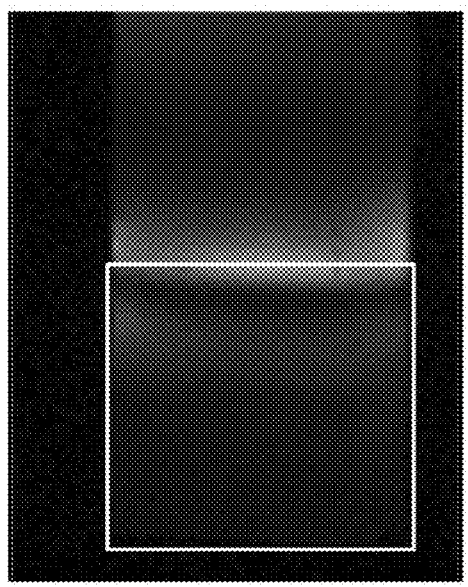
FIG. 5B is a photograph illustrating a luminescent state of a joining state detection film with application of physical stimulation.

FIG. 5B is a photograph in which the luminescent state of the joining state detection film obtained in the same manner as that in Example 1 is recorded.

As can be seen from this drawing, it was found that light was not emitted at a lower portion of the joining state detection film that corresponded to the joining part, unlike Example 1.

Example 4

Figure 6A:
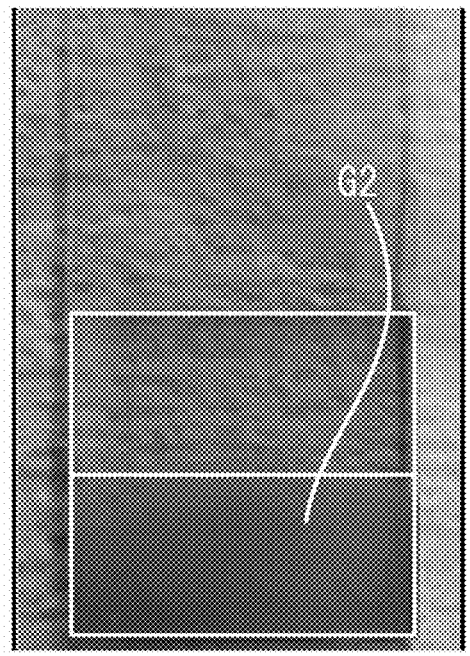
FIG. 6A is a photograph of joining when an adhesive is applied to a lower portion of a joining part in Example 4.

As shown in FIG. 6A, a joining state detection film was formed in the same manner as that in Example 1 except that an adhesive was applied to only a lower portion G2 of a joining part and members were joined (the adhesive was not applied at a portion other than G2 of the joining part).

Figure 6B:
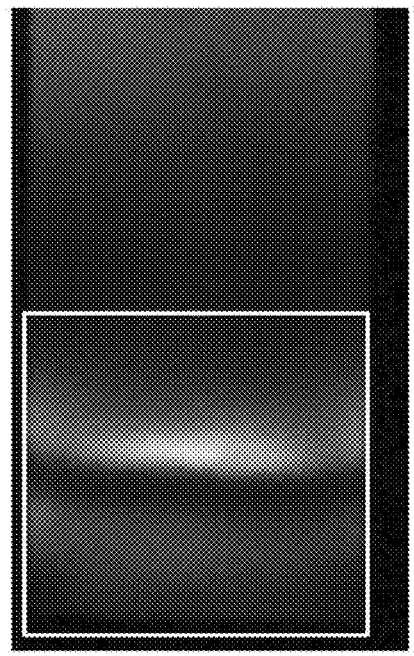
FIG. 6B is a photograph illustrating a luminescent state of a joining state detection film with application of physical stimulation.

FIG. 6B is a photograph in which the luminescent state of the joining state detection film obtained in the same manner as that in Example 1 is recorded.

As can be seen from this drawing, it was found that a linear portion where light was not emitted was present in a portion of the joining state detection film corresponding to a portion near a boundary between the portion G2 where the members were joined using the adhesive and a portion where the members were not joined, unlike Example 1.

From the foregoing results, it was found that a state of a portion where the members are joined using the adhesive can be grasped from the luminescent state of the joining state detection film.

Figure 7:
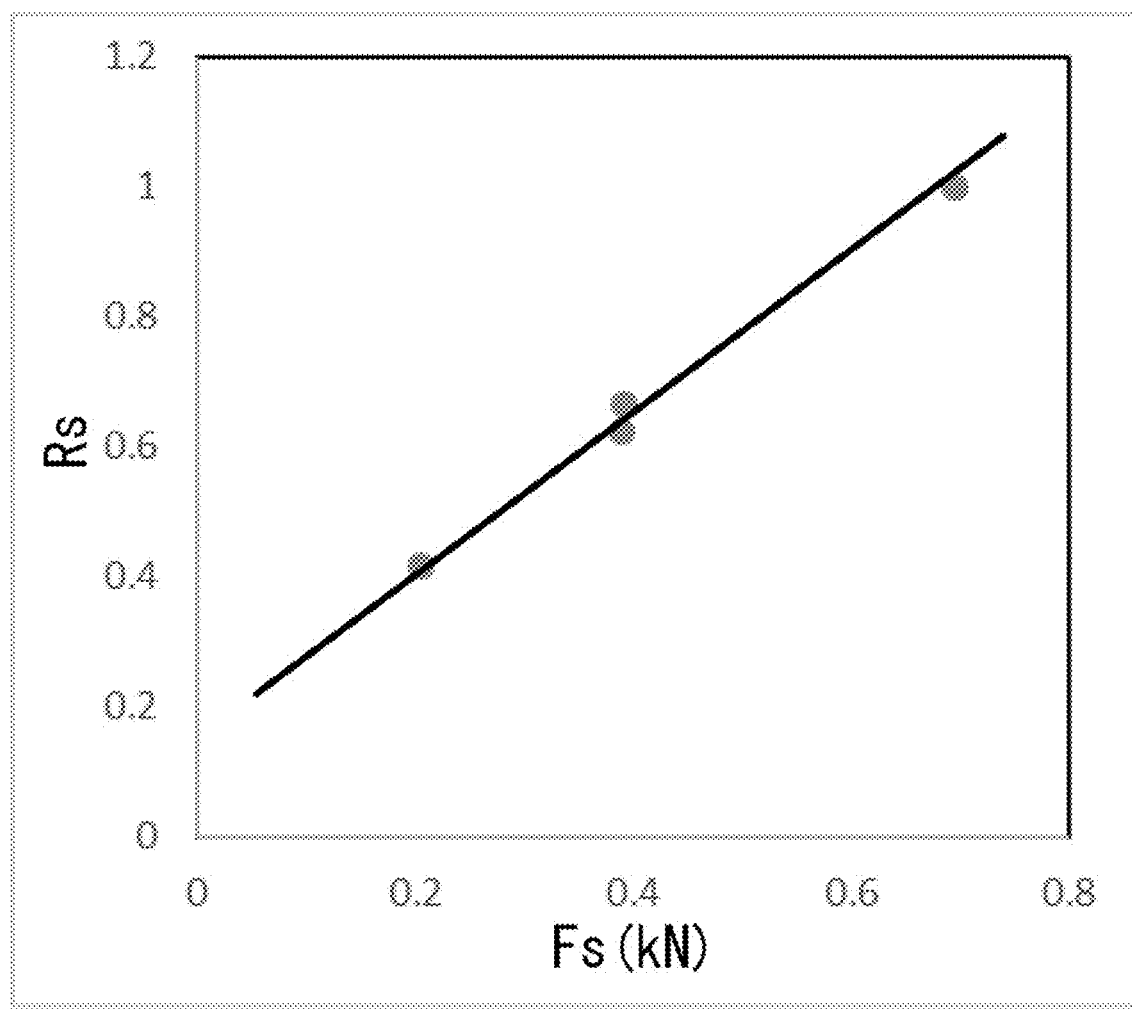
FIG. 7 is a graph showing a relationship between a load at the time of rupture of a joining assembly and a ratio of the luminescent area of the joining state detection film to the area of a joining surface in Examples 1 to 4.

A relationship between a load Fs at the time of rupture of the joining assembly and a ratio Rs of the luminescent area of the joining state detection film to the area of the joining surface in each of Examples described above was determined. The results are shown in FIG. 7. The load at the time of rupture of the joining assembly was determined by a test machine. The area of the luminescent surface was determined by an image analysis software (ImageJ manufactured by National Institutes of Health, Photoshop (registered trademark) manufactured by Adobe KK).

As can be seen from this drawing, it was found that the relationship between the load Fs at the time of rupture of the joining assembly in Examples and the ratio Rs of the luminescent area was linear. It was also found that by the use of this relationship, a relative joining strength of a joining part can be presumed from the ratio Rs of the luminescent area. When a calibration line representing a relationship between the joining strength and the ratio of the luminescent area is formed in advance, the joining strength at that time can be measured on the basis of the measured ratio of the luminescent area.

Example 5

A joining state detection film was formed in the same manner as that in Example 1 except that the curing temperature (60° C., 70° C., 80° C.) of an adhesive was changed. Herein, the adhesive (DENATITE 2204 available from Nagase ChemteX Corporation) has a property in which as the curing temperature is higher, the adhesion strength (joining strength) is higher.

Figure 8:
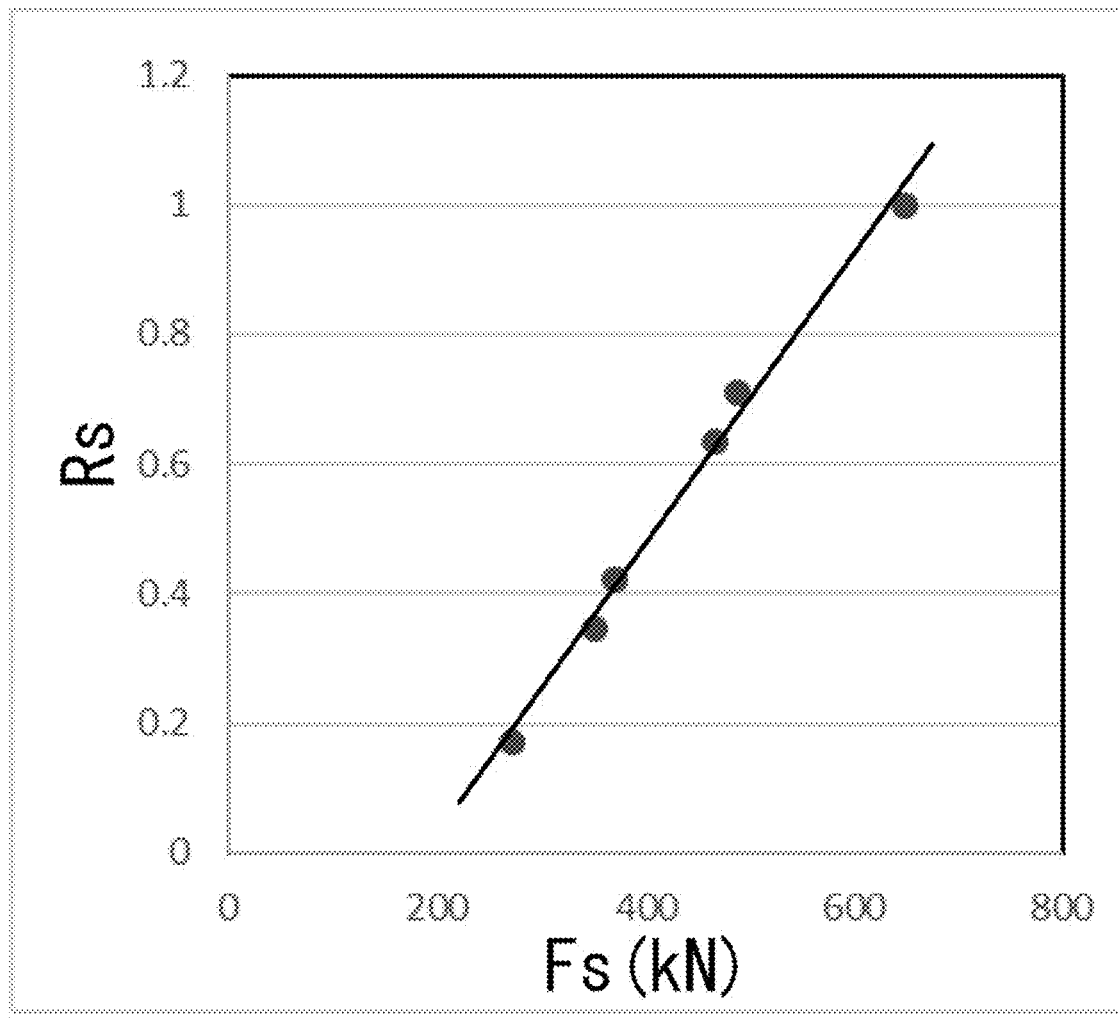
FIG. 8 is a graph showing a relationship between a load at the time of rupture of a joining assembly and a ratio of the luminescent area to the area of a joining surface in Example 5.

In the same manner as that in Example 1, the luminescent state of the joining state detection film during adhesion at each curing temperature was recorded. From the obtained results, the ratio of the luminescent area to the area of the joining surface during adhesion at each curing temperature was calculated. FIG. 8 shows a relationship between the load Fs at the time of rupture of the joining assembly and the ratio Rs of the luminescent area of the joining state detection film to the area of the joining surface in Example 5.

As can be seen from this drawing, it was found that the relationship between the load Fs at the time of rupture of the joining assembly and the ratio Rs of the luminescent area was linear. Therefore, it was found that a relative joining strength can be presumed from the ratio Rs of the luminescent area. Also, it was found that when a calibration line is formed as described above in advance, the joining strength at that time can be measured on the basis of the measured ratio of the light emission area.

Second Embodiment

Figure 9:
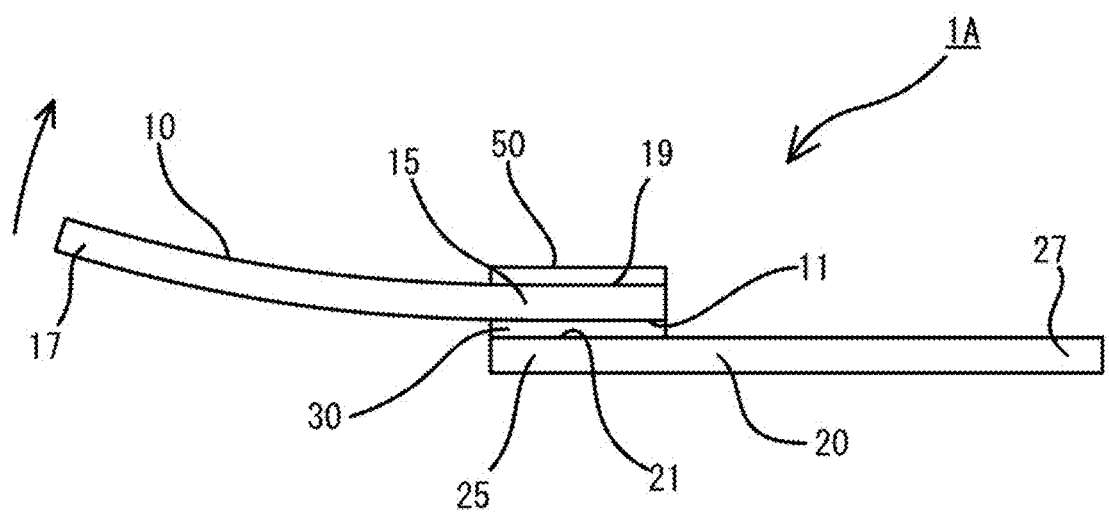
FIG. 9 is a schematic side view of a joining state detection device according to a second embodiment.

In the first embodiment, the drawing device is used as a stimulation unit. However, the present invention is not limited to this. For example, a joining state detection device 1A may be configured to use as a stimulation unit those capable of lifting up the end 17 of the member 10 on the side opposite to the joining part 15, as illustrated in FIG. 9.

Herein, the stimulation unit of this embodiment is not particularly limited as long as it can deform the member 10 as described above. A configuration other than the above is the same as that of the joining state detection device of the first embodiment.

The joining state detection device 1A having such a configuration can also produce the same effects as those in the first embodiment.

Third Embodiment

Figure 10:
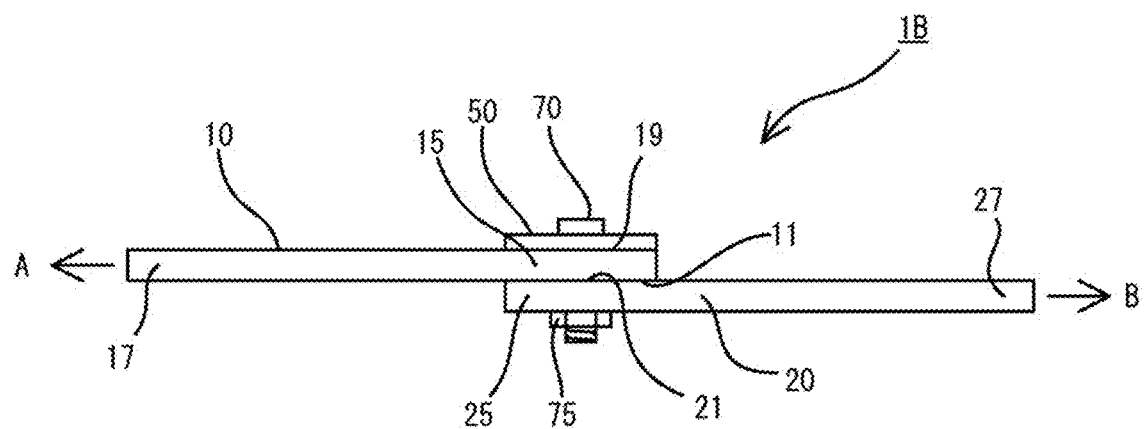
FIG. 10 is a schematic side view of a joining state detection device according to a third embodiment.

In the aforementioned embodiments, the members are joined using the adhesive. However, the present invention is not limited to the embodiments. For example, the members 10 and 20 may be joined using a bolt 70 and a nut 75, as illustrated in FIG. 10. In this embodiment, a joining state detection film is not formed on a head of the bolt 70. However, the joining state detection film may be formed on the head of the bolt 70. A configuration other than the above is the same as that of the joining state detection device of the first embodiment.

Even when the members 10 and 20 are joined using the bolt 70 and the nut 75 as described above, the application of physical stimulation to the joining part 15 by a stimulation unit can cause the joining state detection film 50 to emit light in the same manner as that in the first embodiment. When the luminescent state of the obtained joining state detection film 50 is analyzed, a joining state detection device 1B according to this embodiment can easily detect the joining state of the joining part 15 like the joining state detection device of the first embodiment.

Further, even when two members are joined using a rivet, a screw, a clinching fastener, or swaging, or even when two members are joined by static electricity, anodic bonding, or welding, the joining state of the joining part 15 can be easily detected similarly.

Fourth Embodiment

Figure 11:
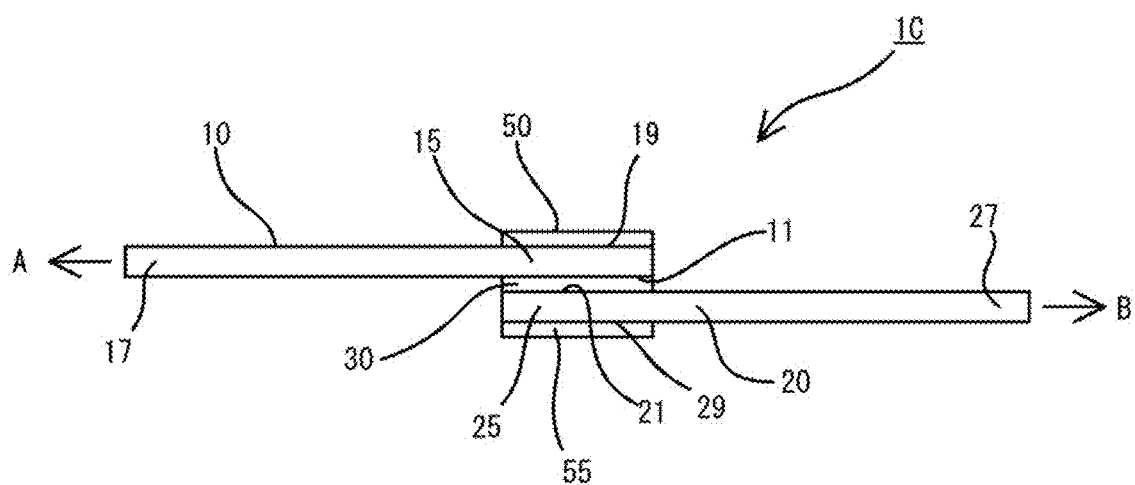
FIG. 11 is a schematic side view of a joining state detection device according to a fourth embodiment.

In the aforementioned embodiments, the joining state detection film 50 is formed on the surface 19 of the member 10 on the side opposite to the joining surface 11 thereof. However, the present invention is not limited to the embodiments. For example, a joining state detection device 1C may be configured to further form a joining state detection film 55 on a surface 29 (lower surface) of the member 20 on a side opposite to the joining surface 21 thereof and dispose a camera (not shown) as a recording unit below the joining state detection film 55, as illustrated in FIG. 11. A configuration other than the above is the same as that of the joining state detection device of the first embodiment.

The joining state detection device 1C having such a configuration can record the luminescent state of the joining state detection film 55 in addition to the luminescent state of the joining state detection film 50. When the member 10 is drawn in the A direction and the member 20 is drawn in the direction opposite to the A direction (B direction) by the stimulation unit, not only the luminescent state of the joining state detection film 50 but also the luminescent state of the joining state detection film 55 can be simultaneously detected.

Therefore, the joining state of the joining part 15 as viewed from a side of the member 10 (in a top view) and the joining state of a joining part 25 as viewed from a side of the member 20 (in a bottom view) can be simultaneously detected. The joining states can be more accurately detected.

OTHER EMBODIMENTS

In the aforementioned embodiments, the joining state detection film is formed over the entire surface of each joining part on the side opposite to the joining surface thereof. However, the present invention is not limited to the embodiments. For example, the joining state detection film may be formed on a portion of the surface of the joining part on the side opposite to the joining surface thereof, or the joining state detection film (joining state visualization film) may be formed not only on the surface of the joining part on the side opposite to the joining surface thereof but also on a surface other than that surface like Examples 1 to 4.

For example, the joining state visualization film may be formed not only on the surface of the joining part on the side opposite to the joining surface thereof, but also a side surface of the joining part and an end surface of the joining part (an end surface of the joining part of at least one of two members). The joining state visualization film can be produced or formed similarly to the aforementioned joining state detection film.

Formation of the joining state visualization film on the surfaces can produce the effects of the aforementioned embodiments, and also can visualize a state of an adhesive or strain of each member, easiness of movement (bending, rotation, vibration, or the like), or the like. The joining state visualization film may be formed on a portion of the side surface and the end surface of the joining part, but not the entire surface thereof.

In the aforementioned embodiments, the joining state of the joining parts in which the two members are joined is detected. However, even when joining parts are formed by joining three or more members, it is considered that two members are joined at a portion of the joining parts to which an attention is paid. Therefore, the joining state of the joining parts in which three or more members are joined can be detected similarly.

In the aforementioned embodiments, two members are joined using any one of an adhesive, a rivet, a bolt and a nut, anodic bonding, welding, and the like. However, the members may be joined by a combination thereof. For example, two members may be joined using an adhesive and a bolt and a nut. Even when such joining is adopted, the joining state of the joining part can be detected in the same manner as that in the embodiments.

In the aforementioned embodiments, the joining state detection device is configured so that the directions of the stimulation unit and a load applied by the stimulation unit (physical stimulation) are set in a predetermined direction. However, the present invention is not particularly limited to the embodiments. For example, as the stimulation unit, a unit that can apply compression, rotation, twist, peeling, vibration, shock, ultrasonic wave, or the like to the members can be used to give the load (physical stimulation) in a corresponding direction. Even when such a stimulation unit is used, the joining state of the joining part can be detected similarly to the joining state detection devices of the aforementioned embodiments.

In the aforementioned embodiments, light is emitted without giving energy to the joining state detection film and the joining state visualization film. However, before or during the operation of the joining state detection device, the joining state detection film and the joining state visualization film may be irradiated with ultraviolet light or the like. Thus, the luminescent intensity of the joining state detection film and the joining state visualization film can be enhanced.

REFERENCE SIGNS LIST 1, 1A, 1B, 1C joining state detection device
10, 20 member
11, 21 joining surface
15,25 joining part
17,27 end
19, 29 surface
30 adhesive
50, 55 joining state detection film
70 bolt
75 nut

The invention claimed is:
1. A joining state detection method for detecting a joining state of two members that are joined at joining parts each having a joining surface, the method comprising the steps of:

forming the joining state detection film containing a mechanoluminescent substance on a first surface of a first of the two joining parts, the first surface being opposite to the joining surface of the first joining part; and physically stimulating the joining part such that light is emitted from a luminescent part of the joining state detection film and light is not emitted from a non-luminescent part of the joining state detection film and an area of the non-luminescent part indicates an area of the joining surface where the two members are not joined.

2. The joining state detection method according to claim 1, wherein the mechanoluminescent substance contained in the joining state detection film is a substance represented by $SrAl_2O_4$ that is doped with $Eu^{2+}$, a substance represented by $SrAl_2O_4$ that is doped with at least one of $Eu^{2+}$, $Ho^{3+}$, $Dy^{2+}$, $M_1$, $M_2$, and $M_3$ ($M_1$, $M_2$, and $M_3$ are monovalent to trivalent different metal ions), or a substance represented by $CaYAl_3O_7$ that is doped with $Eu^{2+}$.

3. The joining state detection method according to claim 1, wherein the two members are joined using an adhesive, a rivet, a bolt and a nut, a screw, a clinching fastener, and swaging.

4. The joining state detection method according to claim 1, wherein the two members are joined by static electricity, anodic bonding, or welding.

5. The joining state detection method according to claim 1, wherein a joining strength between the two members is detected on a basis of an area ratio of the luminescent part to the joining surface.

6. The joining state detection method according to claim 1, wherein the step of forming a joining state detection film further forms a joining state visualization film containing a mechanoluminescent substance on at least one of a side surface and an end surface of the joining part.

* * * * *